3,100,131
PROCESS FOR DYEING FIBERS WITH REACTIVE DYESTUFFS

Harlan B. Freyermuth, Easton, Pa., and Henry R. Mautner, Leonia, N.J., assignors to General Aniline & Film Corporation, New York, N.Y., a corporation of Delaware
No Drawing. Filed Jan. 4, 1960, Ser. No. 67
7 Claims. (Cl. 8—1)

This invention relates to a novel dyeing process, and more particularly to a process for dyeing textile fibers and the like with a group of dyestuffs effective for producing dyeing in any desired shades of improved fastness properties and the like.

A number of dyeing processes are known in which dyeings of improved fastness properties are purportedly obtained by reaction between the dyestuff and the fiber. Included among such processes are those involving the use of dyestuffs containing a vinyl sulfone group, or a sulfatoethylsulfone group which is said to convert to the vinyl sulfone during the dyeing process. Such dyestuffs are somewhat expensive to produce and are not sufficiently stable to the wide range of pH conditions often found necessary in treating different types of textile fibers.

It is an object of this invention to provide a novel process for dyeing textile fibers in any desired shades of improved fastness properties. Another object of this invention is the provision of a process for dyeing textile fibers and the like which will not be subject to the above disadvantages. Other objects and advantages will appear as the description proceeds.

The attainment of the above objects is made possible by the invention which comprises a process for dyeing fibers containing a reactive hydrogen atom comprising treating the fibers with an aqueous dispersion of a dyestuff containing at least one nuclearly substituted $HOCH_2CH_2SO_2(CH_2)_n$-group, wherein $n$ has a value of 0 to 1, and then drying and heat curing the treated fibers at a temperature of at least about 250° F. It has been found that this process enables the production of dyeings having surprisingly excellent fastness properties, particularly wash-fastness and fastness to alkaline and acid perspiration and the like. Further, the process is much more stable to acid and alkaline conditions and may be applied at any desired pH depending upon the fibers being treated and the like.

A preferred group of dyestuffs for use in the present process are the azo dyestuffs having the formula

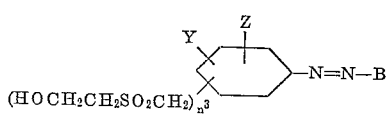

wherein Y and Z are selected from the group consisting of H, lower alkyl and lower alkoxy; $n^3$ has a value of 2 to 3; and B represents the residue of an azo coupling component containing a sufficient number of solubilizing groups to solubilize the dyestuff. In this formula, Y and Z may represent H, methyl, ethyl, methoxy or ethoxy or the like; $n^3$ preferably has a value of 2; and the two hydroxyethylsulfonylmethyl groups are in meta position relative to the azo bridge; and B is preferably a nuclearly sulfonated 1-phenyl-5-pyrazolone or a nuclearly sulfonated naphthol or naphthylamine.

These dyestuffs may be readily prepared in known manner by diazotizing a compound having the formula

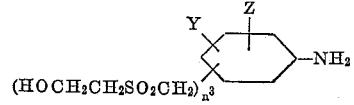

and coupling the diazotized compound (diazo component, diazonium compound) with any azo coupling component B wherein Y, Z, B and $n^3$ have the values given above.

The solubilizing group in the coupling component B is preferably a sulfonic acid group, although in some instances carboxylic acids, sulfonamide, and other similar groups may be employed to solubilize the dyestuff. A sufficient number of such solubilizing groups are present to solubilize the dyestuff, although in some instances the dyestuff may be soluble (readily dispersible) without such groups. Such solubilizing groups may be present in the coupling component prior to the coupling reaction, or they may be inserted subsequently to the coupling reaction, for example by sulfonation or the like.

The above diazo components may be prepared by polychloromethylating a nitrobenzene with bis-chloromethyl ether in sulfuric acid or chlorosulfonic acid, or with formaldehyde, zinc, chloride and HCl, followed by reacting the resulting polychloromethylated derivative with mercaptoethanol, oxidizing hydroxyethylmercaptomethyl groups in the resulting intermediate through the sulfoxide to the sulfone, and finally reducing the nitro group to the corresponding amine. The preferred diazo component is 5-amino-2-methyl-m-xylylene-$\alpha^1,\alpha^3$-bis(2-sulfonylethanol), prepared by bischloromethylating 4-nitrotoluene, reacting the bischloromethylated derivative with mercaptoethanol, oxidizing the sulfide through the sulfoxide to the sulfone, and finally reducing the nitro group to the corresponding amine. This compound has been found to yield optimum results with respect to fastness properties and the like.

Any azo coupling component may be employed to provide the B component in the present dyestuffs. An important group of azo coupling components are the carbocyclic and heterocyclic compounds containing a nuclearly substituted hydroxy or amino group directing coupling in ortho or para position thereto.

Another important group of azo coupling components are the heterocyclic compounds containing a reactive nuclear methylene group usually associated with an adjacent keto group (ketomethylene linkage) as in the 5-pyrazolones.

Still another important group of azo coupling components are the compounds containing an aliphatic or alicyclic ketomethylene group as in the acylacetic acid arylidea and esters.

As examples of suitable azo coupling components falling within the above classifications, there may be mentioned anilines, aminonaphthalenes, phenols, naphthols, pyrrols, indoles, 2-hydroxy-carbazoles, 3-hydroxydibenzofurans, 2-naphthol-3-carboxylic acid arylamides, amino and hydroxy pyridines, pyridones and pyrimidines, 2,4-dihydroxyquinoline, 9-methylacridine, 5-pyrazolone, 1-phenyl-3-methyl-5-pyrazolone, 1 - phenyl-5-pyrazolone-3-carboxylic acid, acetoacetic acid anilide, benzoylacetic acid anilide, and substituted, fused ring, and other derivatives thereof. Such coupling components may contain any desired auxochrome substituents, solubilizing groups, and the like.

The above-described azo dyestuffs, their advantages and methods for their production, are disclosed and claimed in the copending application Serial No. 862,802, filed by Randall et al. on December 30, 1959.

Another preferred group of dyestuffs useful in the process of this invention are those having the formula

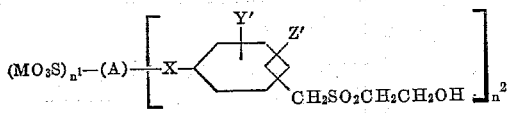

wherein A represents a dyestuff moiety, X is a bridging link containing up to 3 linking atoms selected from the group consisting of C, S, O and N and mixtures thereof; Y' and Z' are selected from the group consisting of H, lower alkyl, lower alkoxy and —$CH_2SO_2CH_2CH_2OH$; M is a member of the group consisting of H and alkali metal, alkaline earth metal, ammonium and amine cations; $n^1$ has a value of 0 to 3; and $n^2$ has a value of 1 to 4.

In the above formula A represents any organic dyestuff molecule. Any known dyestuff molecule may be employed, such dyestuffs generally being of aromatic character in containing at least one carbocyclic or heterocyclic ring in which the pendant aryl nucleii and the sulfonic acid radicals may be substituted. Venkataraman's "Chemistry of Synthetic Dyes," Academic Press, N.Y., 1952, volumes I and II, discloses a multitude of synthetic dyestuffs which may be employed in producing the above dyestuffs. Natural organic dyestuffs may of course also be employed, in the same manner.

Preferably, the A moiety is the residue of an azo, quinoid, indigoid, thioindigoid, di- or tri-phenylmethane, xanthene, acridine, azine, oxazine, thiazine, sulfur or cyanine dyestuff. The invention is particularly advantageous when the A moiety is relatively insoluble in view of the solubilizing effects resulting from the substitution therein of the said pendant aryl nucleii and, desirably, the sulfonic acid radicals.

In the above formula, X preferably represents the diatomic bridging link —$SO_2NR$—, or the monoatomic bridging link —NR—, wherein R is alkyl of 1 to 4 carbon atoms, e.g. methyl, to butyl or preferably H, as more fully described below. However, the identity of X is not too critical, and may also represent other known equivalent mono-, di-, or triatomic bridging links suitable for connecting the pendant aryl nuclei in the present compounds to the fundamental aryl nuclei of the dyestuff molecule.

Illustratively, other suitable bridging links include —O—, —$NRSO_2$—, —$SO_2NRNH$—, —$CH_2$—, —$C_2H_4$—, $CH_2SO_2$—, —$CH_2NR$—, —$CH_2S$—, —$CH_2O$—, —CO—, —S—, —$CONH$—, —NHCO—, and —$SCH_2$, the actual linking atoms in such bridging links being generally C, S, O or N or any combination thereof. Methods for producing dyestuffs of the present type containing such bridging links are known and will otherwise become apparent to persons skilled in the art.

As shown in the above formula, Y' and Z' may represent H, lower alkyl such as methyl and ethyl, lower alkoxy such as methoxy, and ethoxy, and the hydroxyethylsulfonylmethyl group. M may represent H, sodium, potassium, lithium, calcium, barium, magnesium, ammonium, mono-, di-, and tri-ethanol-, -propanol-, -methyl-, -ethyl-, and -propyl-amines, cyclohexylamine, morpholine, pyridine, picoline, and the like. It will be understood that these defined dyestuffs will comprise mixtures of molecules containing different amounts of substituents attached to A in the above formula, and that $n^1$ and $n^2$ represent the average of such substituents therein.

In accordance with the above-described preferred embodiments, dyestuffs for use in the present invention may be prepared by reacting 5-amino-2-methyl-m-xylylene-$\alpha^1,\alpha^3$-bis(2-sulfonylethanol) with the halogenated or chlorosulfonated dyestuff such as brominated anthraquinone or a chlorosulfonated dioxazine dyestuff. These and other dyestuffs of the above described type, their advantages and methods for their production are disclosed and claimed in copending application Serial No. 863,126 filed by Mayhew et al. on December 31, 1959.

The process of this invention may also be carried out with dyestuffs corresponding to those above described but wherein n has a value of 0. These dyestuffs would accordingly contain at least one nuclearly substituted $HOCH_2CH_2SO_2$-group. A number of such compounds are disclosed in the prior art, as for example the compounds disclosed in columns 3 and 4 of U.S. Patent No. 2,670,265 as intermediates in the production of the esters with which the patent is concerned. It is, however, preferred to employ dyestuffs of the type described in which the hydroxyethylsulfone group is nuclearly substituted through a methylene bridge.

The dyestuffs employed in this invention have been found to be highly effective for dyeing and printing natural and synthetic fibers, particularly cellulosic fibers, in any desired shades of good to excellent fastness properties such as wash-fastness and the like. The dyeing or printing is preferably carried out by application of an aqueous dispersion of the dyestuff to the fibrous material followed by drying and curing the treated material at a temperature of at least about 250° F., the maximum temperature being limited by the heat resistance of said material. The fibrous material may be in any of the usual forms, as for example in form of staple fiber or continuous filaments in bulk form or in the form of tow, rope, yarns, slubbings, warps, fabrics, felts and the like, and treated as a wound package, running lengths, fibrous stock, bulk, etc. In addition to cellulose, these dyestuffs are also highly effective for dyeing and printing other fibers, including natural and synthetic polyamides such as wool, silk, casein, zein, nylon and polyurethane fibers.

The process of this invention enables the production of dyeings and prints having excellent fastness to wash, light, crocking and acid and alkaline perspiration.

The process of this invention has been disclosed as including treatment of the fibers with an aqueous dispersion of the described dyestuffs. It will be understood that as employed herein, the term "aqueous dispersion" is intended to include solutions, dispersions, or stable or colloidal suspensions of the dyestuff, appropriately thickened in known manner when employed in a printing process. The aqueous dispersions of the dyestuff is applied by immersion, padding, printing or the like to the fibrous material followed if desired by a squeezing step whereafter the fibrous material is dried and then cured at a temperature of at least 250° F. The duration of the curing step will generally vary inversely with the temperature although of course the temperature and duration will depend upon the type of fiber being treated. In general, the curing step will usually range up to five minutes or more at 250° F. to as little as thirty seconds or less at 475 to 500° F. The optimum curing temperature and duration may be readily determined by routine experimentation in any particular instance.

The aqueous dispersion being applied may be at any pH although optimum results are generally obtained using an alkaline pH, preferably from about 8.5 to 10.5 when treating cellulose fibers. The alkaline pH may be attained in any desired manner, as by use of known alkaline reacting agents such as sodium carbonate, sodium bicarbonate, and the like. A neutral or acid pH is usually preferred when treating polyamide fibers, in which case the dyestuffs are substantive to these fibers. A small amount of urea added to the aqueous dispersion in many instances enables the attainment of further improved results, being beneficial for solubilization and development of the dyestuffs.

The mechanism by which the process of this invention yields dyeings and prints of improved fastness properties and the like is apparently due to a reaction between the dyestuff and the fiber, e.g. an etherification reaction with the hydroxy groups in cellulose, an esterification reaction with carboxy groups in synthetic fibers containing recurring carboxylic groups in the polymer chain, etc. When the preferred above-described bishydroxyethylsulfonylmethyl-(preferably in meta position) containing dyestuffs are employed, a further possibility of cross-linking exists which would yield further improvements in fastness properties, and the like.

The following examples are only illustrative of the present invention and are not to be regarded as limitative. All parts and proportions referred to herein and in the appended claims are by weight unless otherwise indicated.

*Example 1*

4 parts of the azo dye disclosed in Example 1 of said copending application of Randall et al., obtained by coupling diazotized 5-amino-2-methyl-m-xylylene-$\alpha^1,\alpha^3$-bis(2-sulfonylethanol) with p-(3-methyl-5-oxo-2-pyrazolin-1-yl)-benzene sulfonic acid, 12 parts of urea and 3 parts of sodium carbonate are dissolved in 125 parts of water and the dyestuff solution is padded on cotton piece goods. The padded goods are dried and then heat cured at 300° F. for 3 minutes. The dyed goods are then soaped at the boil for five minutes to remove traces of unreacted dye. A brilliant yellow shade is produced on cotton piece goods, which has excellent wash fastness properties and also very good fastness to light and crocking.

*Example 2*

4 parts of the azo dye disclosed in Example 4 of said copending application of Randall et al., obtained by coupling diazotized 5-amino-2-methyl-m-xylylene-$\alpha^1,\alpha^3$-bis(2-sulfonylethanol) with 8-acetylamino-1-naphthol-3,6-disulfonic acid (acetyl H acid), 16 parts of urea and 3 parts of sodium carbonate are dissolved in 125 parts of water and this solution of the dyestuff is padded on cotton piece goods. The padded piece goods are dried and then heat cured at 310° F. for 3 minutes, soaped at the boil for 5 minutes in a solution of sodium N-methyl-N-palmitoyl taurate to remove unreacted dye. A bright bluish red shade is produced having excellent wash fastness properties.

*Example 3*

The procedure of Example 1 is repeated, except that the dyestuff employed is the dyestuff disclosed in Example 1 of said copending application of Mayhew et al., obtained by reacting 5-amino-2-methyl-m-xylylene-$\alpha^1,\alpha^3$-bis(2-sulfonylethanol) with the chlorosulfonated dioxazine dyestuff obtained from N-ethyl-3-aminocarbazole. A reddish-blue dyeing is obtained having excellent wash fastness properties, as evidenced by little loss of shade upon soaping of the dyeing, in addition to other good fastness properties.

*Example 4*

The procedure of Example 1 is repeated, except that the dyestuff employed is the dyestuff disclosed in Example 2 of said copending application of Mayhew et al., obtained by reacting 5-amino-2-methyl-m-xylylene-$\alpha^1,\alpha^3$-bis(2-sulfonylethanol) with sodium 1-amino-4-bromo-2-anthraquinone sulfonate. A bright greenish-blue dyeing is obtained which has excellent fastness to washing and crocking. Cotton piece goods printed with a thickened dispersion of the same dyestuff also possesses excellent fastness properties. Similar results are obtained on wool, nylon, silk and rayon.

This invention has been disclosed with respect to certain preferred embodiments and various modifications and variations thereof will become obvious to the person skilled in the art. It is to be understood that such modifications and variations are to be included within the spirit and scope of this invention. Thus, it will be understood that the aqueous dispersion of dyestuff employed in the present process may contain any other substances usually employed for improving dyeings, and prints, as for example wetting, dispersing and other surface active agents, thickening agents, protective agents, stabilizers, plasticizers, and the like.

We claim:

1. A process for dyeing fibers containing a reactive hydrogen atom comprising treating the fibers with an aqueous dispersion of a dyestuff containing two

$HOCH_2CH_2SO_2CH_2$-groups substituted in the same nucleus of the dyestuff molecule, and then drying and heat curing the treated fibers at a temperature of at least about 250° F.

2. A process as defined in claim 1 wherein the fibers are cellulose fibers.

3. A process as defined in claim 1 wherein the dyestuff is an azo dyestuff in which the diazo component is derived from a diazotized aminobenzene containing said groups substituted therein.

4. A process as defined in claim 1 wherein the dyestuff is an anthraquinone moiety nuclearly bonded through an —NH-group to a benzene ring nuclearly substituted by said groups.

5. A process as defined in claim 1 wherein the dyestuff is a dioxazine dyestuff nuclearly bonded through an —SO$_2$NH-group to a benzene ring nuclearly substituted by said groups.

6. A process as defined in claim 1 wherein the dispersion has a pH of about 8.5 to 10.5.

7. A process as defined in claim 1, wherein the dispersion also contains urea.

References Cited in the file of this patent

UNITED STATES PATENTS

| | | |
|---|---|---|
| 1,935,929 | Zahn et al. | Nov. 21, 1933 |
| 2,033,316 | Zahn et al. | Mar. 10, 1936 |
| 2,355,497 | Zwilgmeyer | Aug. 8, 1944 |
| 2,670,265 | Heyna et al. | Feb. 23, 1954 |
| 2,895,785 | Alsberg et al. | July 21, 1959 |
| 2,978,289 | Barker et al. | Apr. 4, 1961 |

FOREIGN PATENTS

| | | |
|---|---|---|
| 966,565 | Germany | Nov. 7, 1957 |